(12) United States Patent
Omori et al.

(10) Patent No.: US 11,050,648 B2
(45) Date of Patent: Jun. 29, 2021

(54) COMMUNICATION SYSTEM

(71) Applicant: TOYOTA JIDOSHA KABUSHIKI KAISHA, Toyota (JP)

(72) Inventors: Yoshifumi Omori, Nagoya (JP); Hiroya Ando, Toyota (JP); Yoko Okubo, Nissin (JP); Kengo Hayashizaki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 16/595,953

(22) Filed: Oct. 8, 2019

(65) Prior Publication Data
US 2020/0195538 A1   Jun. 18, 2020

(30) Foreign Application Priority Data
Dec. 14, 2018  (JP) .............................. JP2018-234585

(51) Int. Cl.
*H04L 12/26* (2006.01)
*H04L 29/08* (2006.01)
*H04L 5/16* (2006.01)

(52) U.S. Cl.
CPC ............ *H04L 43/0817* (2013.01); *H04L 5/16* (2013.01); *H04L 43/10* (2013.01); *H04L 67/12* (2013.01)

(58) Field of Classification Search
CPC . H04L 27/0008; H04L 43/0817; H04L 43/10; H04L 5/16; H04L 67/12
(Continued)

(56) References Cited

U.S. PATENT DOCUMENTS

| 8,149,743 B1* | 4/2012 | Choksi ...................... H04L 5/14 370/296 |
| 2007/0183349 A1* | 8/2007 | Pannell ..................... H04L 5/14 370/276 |

(Continued)

FOREIGN PATENT DOCUMENTS

| JP | 7-50706 A | 2/1995 |
| JP | 2016-146598 A | 8/2016 |

*Primary Examiner* — Robert J Lopata
(74) *Attorney, Agent, or Firm* — Oblon, McClelland, Maier & Neustadt, L.L.P.

(57) ABSTRACT

A communication system including two communication nodes communicably connected in a full duplex communication mode via the same communication line is provided. Each of the two communication nodes includes a first processing unit configured to be able to send a predetermined monitoring frame to another communication node at predetermined intervals and to receive the predetermined monitoring frame from the other communication node at predetermined intervals; a second processing unit configured to detect a monitoring frame missing condition wherein the monitoring frame is received from the other communication node; and a third processing unit configured to switch communication with the other communication node from the full duplex communication mode to a half duplex communication mode when a predetermined condition is satisfied during communication in the full duplex communication mode wherein the predetermined condition includes a condition that the second processing unit detects the monitoring frame missing condition.

5 Claims, 6 Drawing Sheets

(58) Field of Classification Search
USPC .......................................................... 370/244
See application file for complete search history.

(56) References Cited

U.S. PATENT DOCUMENTS

| | | | | |
|---|---|---|---|---|
| 2010/0202329 | A1* | 8/2010 | Nishioka | H04L 5/16 |
| | | | | 370/296 |
| 2011/0125488 | A1* | 5/2011 | Birmingham | H04L 1/0003 |
| | | | | 704/201 |
| 2016/0359608 | A1* | 12/2016 | Noh | H04L 5/1461 |
| 2017/0364053 | A1* | 12/2017 | Hadeli | H04L 63/1416 |
| 2018/0234230 | A1* | 8/2018 | Kalhan | H04L 5/0053 |

* cited by examiner

FIG. 6

| FUNCTION | VEHICLE STATE CONDITION |
|---|---|
| VEHICLE TRAVELING | VEHICLE SPEED: 0 km/h<br>ENGINE SPEED: 0 rpm |
| AUTONOMOUS DRIVING | VEHICLE SPEED: 0 km/h<br>AUTONOMOUS DRIVING FLAG : OFF |
| METER DISPLAY | ACTUAL VEHICLE SPEED: 0 km/h<br>METER DISPLAY VEHICLE SPEED: 0 km/h |
| MULTIMEDIA | NO CONDITION |
| FAILURE DIAGNOSIS | NO CONDITION |

COMMUNICATION SYSTEM

INCORPORATION BY REFERENCE

The disclosure of Japanese Patent Application No. 2018-234585 filed on Dec. 14, 2018 including the specification, drawings and abstract is incorporated herein by reference in its entirety.

BACKGROUND

1. Technical Field

The present disclosure relates to a communication system in which a plurality of communication nodes are communicably connected.

2. Description of Related Art

Japanese Patent Application Publication No. 2016-146598 (JP 2016-146598 A) discloses a communication system in which the communication mode (full duplex/half duplex) of a communication node in an in-vehicle communication network is set by adapting the communication mode of one node to the communication mode of another node appropriately and quickly. Japanese Patent Application Publication No. 7-050706 (JP 7-050706 A) discloses a communication system in which the upstream signal and the downstream signal are separated by converting the two-wire full-duplex communication to the four-wire full-duplex communication so that the upstream signal waveform and the downstream signal waveform can be observed independently.

SUMMARY

In the full duplex communication mode, communication is performed between the two communication nodes by the same communication line (two-wire system). When an abnormality occurs in one of the communication nodes in this communication mode, it cannot be determined which communication node has sent an erroneous waveform by observing the communication waveform flowing through the communication line. Therefore, in a communication system such as that described in Japanese Patent Application Publication No. 2016-146598 (JP 2016-146598 A) in which communication is performed between the communication nodes that are set in the full duplex communication mode, it cannot be determined which communication node has caused an abnormality (failure).

In this case, by resetting the communication mode of the modems at the communication nodes from full duplex communication to half duplex communication or by replacing the modems for the full duplex communication mode by the modems for the half duplex communication mode, the communication waveform flowing through the communication line can be observed and, therefore, the communication node at which an abnormality (failure) has occurred can be identified. In addition, by observing the waveform of the signal converted for use in four-wire full-duplex communication as in the communication system described in Japanese Patent Application Publication No. 7-050706 (JP 7-050706 A), the communication node at which an abnormality (failure) has occurred can be identified. However, in the former case, there is a problem that the user must manually switch from the full duplex communication mode to the half duplex communication mode, which takes time and effort. In the latter case, there is a problem that a discrimination circuit including a high frequency filter and a low frequency filter must be incorporated in advance, which increases the size and cost of the communication system.

The present disclosure provides a communication system in which, when an abnormality occurs, communication between the communication nodes that has been performed in the full duplex communication mode is switched to communication in the half duplex communication mode to allow the abnormality to be diagnosed based on the communication waveform.

To solve the problem described above, one aspect of the present disclosure is a communication system including two communication nodes communicably connected in a full duplex communication mode via the same communication line. Each of the two communication nodes includes a first processing unit configured to be able to send a predetermined monitoring frame to another communication node at predetermined intervals and to receive the predetermined monitoring frame from the other communication node at predetermined intervals; a second processing unit configured to detect a monitoring frame missing condition wherein the monitoring frame is received from the other communication node; and a third processing unit configured to switch communication with the other communication node from the full duplex communication mode to a half duplex communication mode when a predetermined condition is satisfied during communication in the full duplex communication mode wherein the predetermined condition includes a condition that the second processing unit detects the monitoring frame missing condition.

According to the communication system of the present disclosure, when an abnormality occurs, communication between the communication nodes that has been performed in the full duplex communication mode is switched to communication in the half duplex communication mode. Switching the communication mode between the nodes in this way allows the communication waveform from each communication node to be observed alternately and independently, makes it possible to diagnose an abnormality based on the communication waveform.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a diagram showing an example of vehicle states used by a vehicle state monitoring unit to determine whether the data communication mode may be switched.

DETAILED DESCRIPTION OF EMBODIMENTS

In the communication system of the present disclosure, the monitoring frame is sent and received between the communication nodes while data communication is performed between the communication nodes in full duplex communication mode. When one of the communication nodes detects a monitoring frame missing condition during this data communication, the data communication is switched to the half duplex communication mode. Switching data communication in this way allows the communication waveform from each communication node to be observed alternately and independently, making it possible to diagnose an abnormality based on the communication waveforms.

Embodiments of the present disclosure will be described in detail below with reference to the drawings.

First Embodiment

Figure 1:
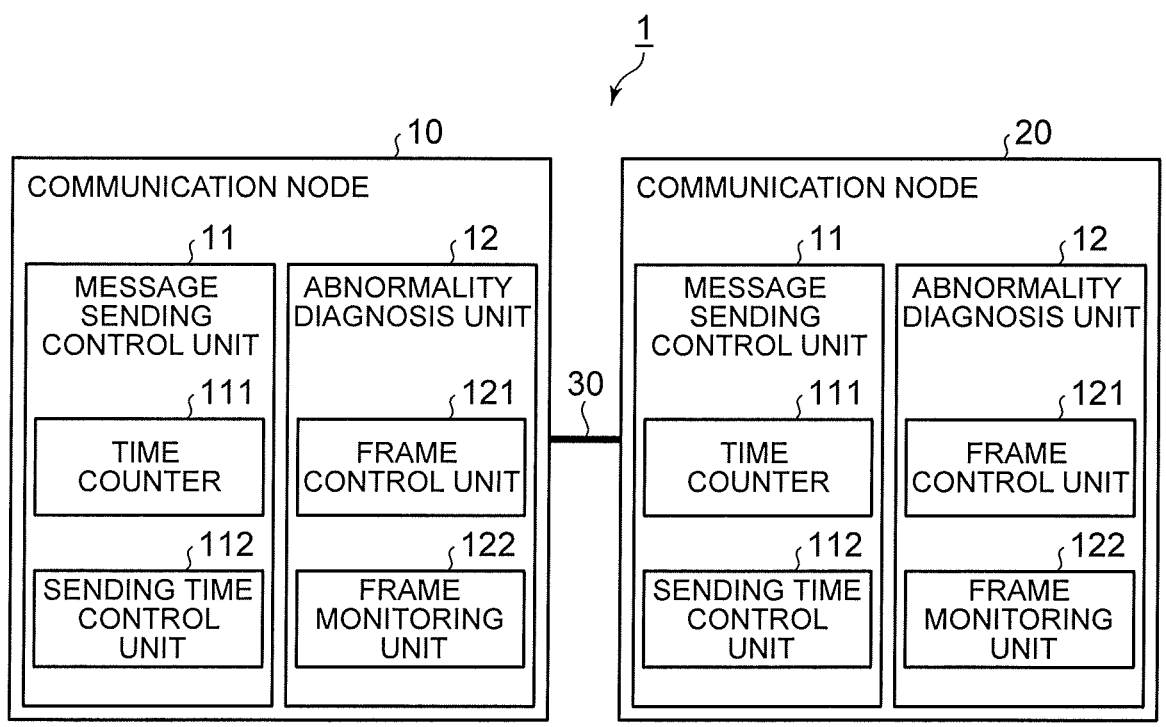
FIG. 1 is a functional block diagram of a communication system according to a first embodiment of the present disclosure.

<Configuration> FIG. 1 is a functional block diagram of a communication system 1 according to a first embodiment of the present disclosure. The communication system 1 shown in FIG. 1 includes a communication node 10 and a communication node 20 each of which includes a message sending control unit 11 and an abnormality diagnosis unit 12. The communication node 10 and the communication node 20 are communicably connected via a communication bus 30 that is a communication line.

The communication system 1 can be applied to a vehicle communication system that uses an Ethernet (registered trademark) network. In such an in-vehicle Ethernet, the communication node 10 and the communication node 20 are connected by the communication bus 30, which is one twisted pair cable, to reduce the number and weight of wire harnesses and to improve the noise resistance performance. In this configuration, the communication nodes 10 and 20 can perform data communication in the full duplex communication mode.

A communication node in the description below is any of the following: (1) a microcontroller that includes a processor (such as a CPU) and a memory (such as a ROM or a RAM) in which predetermined programs to be read and executed by the processor are stored, (2) an electronic control unit (ECU) configured by hardware (such as a transceiver) that includes a chipset for performing Ethernet communication in response to an instruction from the microcontroller, and (3) a switching hub or a gateway that can relay data communication between ECUs. The connection in the description below refers to a physical connection via wire.

The message sending control unit 11 of each of the communication nodes 10 and 20 includes a time counter 111 and a sending time control unit 112 as a third processing unit. The message sending control unit 11 uses this processing unit to control the sending of a message, which includes data frames, to the other communication node.

The time counter 111 counts time. The counting of time is started, for example, when the ignition of the vehicle is turned on (IG-ON). Any method may be used by the time counter 111 for counting time. One example of the counting method is that the counting is repeated in such a way that, when the counting from 0 second to 180 seconds is finished, the counter is once reset to 0 second and then the counting is started for the next 180 seconds.

The sending time control unit 112 controls the time at which a message is to be sent from its own communication node to the other communication node when a monitoring frame missing condition, which will be described later, occurs. The time to send a message is determined based on the count value, counted by the time counter 111, and the predetermined order. How the sending time control unit 112 controls the sending time of a message based on the count value and the order will be described later.

The abnormality diagnosis unit 12 of each of the communication nodes 10 and 20 includes a frame control unit 121 as a first processing unit, and a frame monitoring unit 122 as a second processing unit. The abnormality diagnosis unit 12 uses these processing units to control the sending of a monitoring frame sent from its own communication node to the other communication node and, at the same time, diagnoses whether a reception abnormality has occurred in the monitoring frame sent from the other communication node to its own communication node.

The frame control unit 121 controls the time at which the monitoring frame is to be sent from its own communication node to the other communication node based on the count value counted by the time counter 111. The monitoring frame is a predetermined frame provided for detecting an abnormality in the communication nodes. This monitoring frame is sent from its own communication node to the other communication node at predetermined intervals.

The frame monitoring unit 122 monitors the reception status of the monitoring frame sent from the other communication node to its own communication node. When the monitoring frame cannot be received consecutively for a predetermined time (for example, 10 seconds), the frame monitoring unit 122 detects a monitoring frame missing condition of the other communication node.

Figure 2:
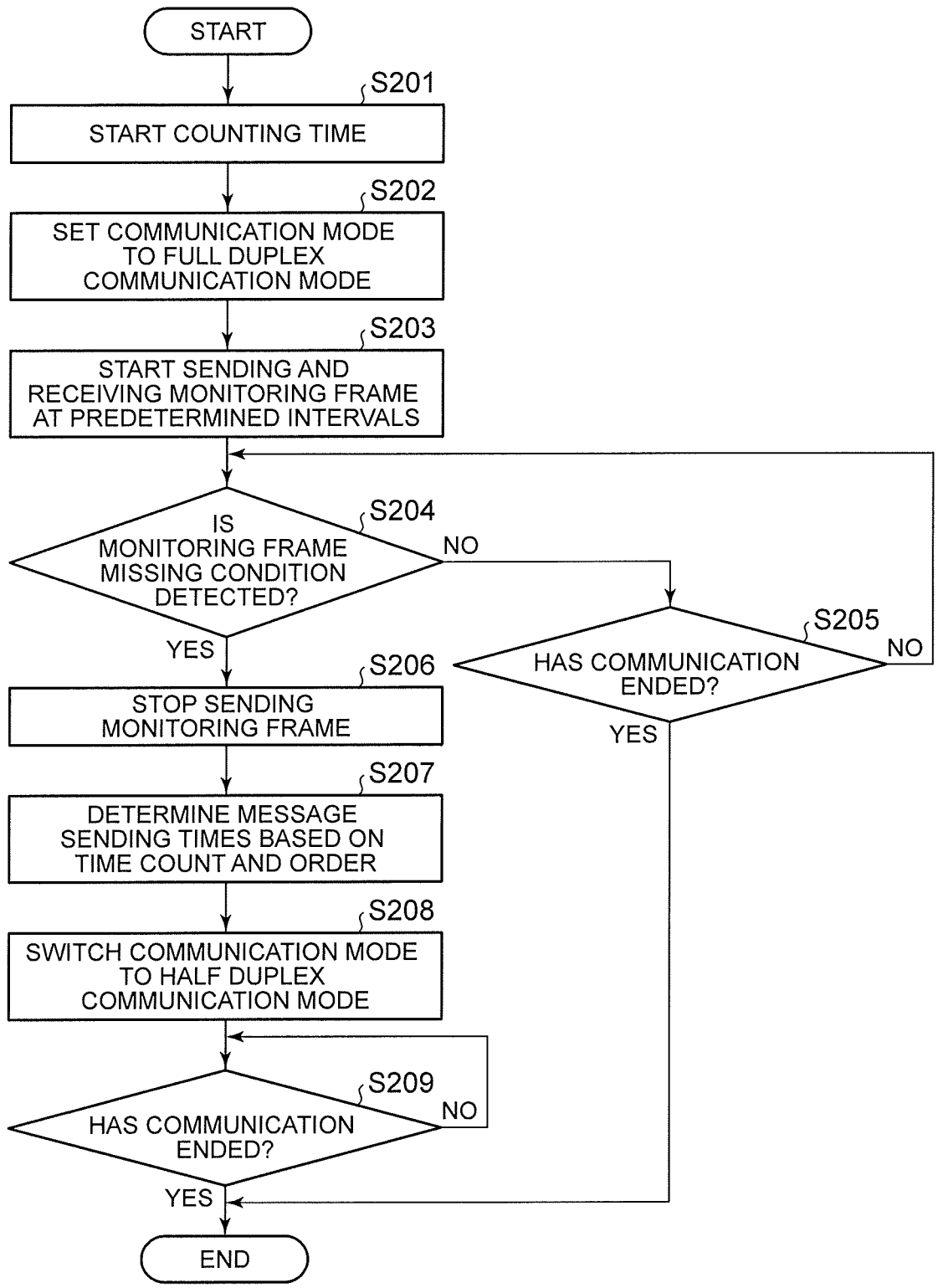
FIG. 2 is a flowchart showing the communication control processing procedure performed by each of the communication nodes in the first embodiment.
Figure 3:
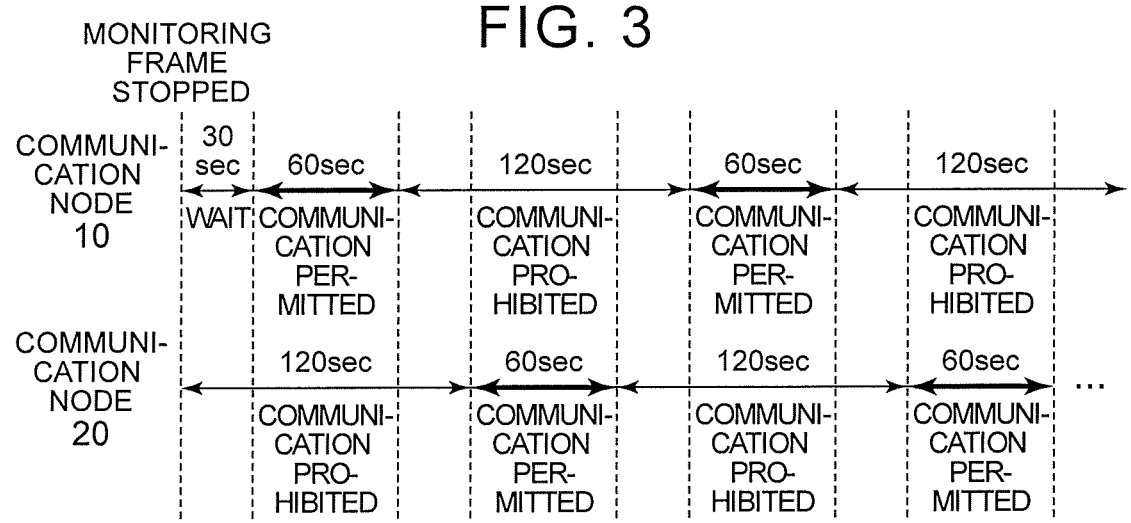
FIG. 3 is a diagram showing an example of times at which messages are sent in the half duplex communication mode between the communication nodes.

<Control> Next, the control performed by the communication system 1 in the first embodiment of the present disclosure will be described below with further reference to FIG. 2 and FIG. 3. FIG. 2 is a flowchart showing the communication control processing procedure performed by each of the communication nodes 10 and 20. FIG. 3 is a diagram showing an example of times at which messages are sent in the half duplex communication mode between the communication node 10 and the communication node 20.

The communication control shown in FIG. 2 is started in each of the communication nodes 10 and 20, for example, when the ignition of the vehicle is turned on (IG-ON).

Step S201: The message sending control unit 11 starts counting time using the time counter 111. When the time counting is started, the processing proceeds to step S202.

Step S202: The message sending control unit 11 sets the mode of communication between the communication nodes to the full duplex communication mode. Once the communication mode is set to the full duplex communication mode, the sending time control unit 112 of each of the communication nodes 10 and 20 starts communication of a messages that includes data frames. When the communication mode is set to the full duplex communication mode, the processing proceeds to step S203.

Step S203: The frame control unit 121 starts sending the monitoring frame from its own communication node to the other communication node. The monitoring frame is sent at predetermined intervals (for example, at a one-second interval). The monitoring frame may be sent as a message along with data frames or may be sent alone as a message. At the same time, the frame monitoring unit 122 also starts receiving (waiting for) the monitoring frame sent from the other communication node to its own communication node. When the sending or receiving of monitoring frames is started, the processing proceeds to step S204.

Step S204: The frame monitoring unit 122 determines whether the monitoring frame that has been received from the other communication node at predetermined intervals is not detected. This determination makes it possible to determine whether an abnormality, such as a failure, has occurred in the communication system 1. More specifically, when the next monitoring frame cannot be received for a predetermined time (for example, 10 seconds) since the monitoring frame was last received from the other communication node, the frame monitoring unit 122 determines that the monitoring frame is not detected (a monitoring frame missing condition is detected). When the frame monitoring unit 122 detects a monitoring frame missing condition (S204, YES), the processing proceeds to step S206; conversely, when the frame monitoring unit 122 does not detect a monitoring frame missing condition (S204, NO), the processing proceeds to step S205.

Step S205: The message sending control unit 11 determines whether the communication has ended. When the communication is not ended (S205, NO), the processing proceeds to step S204 to continue the detection of the monitoring frame missing condition. When the communication is ended (S205, YES), the processing is ended.

Step S206: When a monitoring frame missing condition is detected, the frame monitoring unit 122 stops sending the monitoring frame from its own communication node to the other communication node. As a result, the other communication node cannot receive the monitoring frame. Therefore, even when the other communication node cannot detect that an abnormality has occurred in the communication system 1, the other communication node can determine that an abnormality has occurred in the communication system 1. When the sending of the monitoring frame is stopped, the processing proceeds to step S207.

Step S207: The sending time control unit 112 determines the sending time at which a message is sent alternately from its own communication node to the other communication node, based on the count value, counted by the time counter 111, and the predetermined order. The predetermined order is the information indicating the order of sending the first message after detecting a monitoring frame missing condition. This order may be set statically in such a way that the first communication node 10 is set as "No. 1", and the second communication node 20 as "No. 2". The order may also be set dynamically in such a way that, each time a monitoring frame missing condition is detected, the communication node that first detects the missing condition is set as "No. 1", and the communication node that receives the notification from that communication node as "No. 2".

An example of the sending times is shown in FIG. 3 in which the order of the communication node 10 is "No. 1" and the order of the communication node 20 is "No. 2". When a predetermined waiting time (for example, 30 seconds) has elapsed after the sending of the monitoring frame was stopped in step S206, the communication node 10 is permitted to send a message only for a predetermined communication permitted period (for example, 60 seconds). After the communication permitted period is ended, the communication node 10 is prohibited from sending a message for a predetermined communication prohibited period (for example, 120 seconds). After the communication prohibited period is ended, the communication node 10 is given the communication permitted period again. On the other hand, the communication node 20 is prohibited from sending a message for the communication prohibited period after the sending of the monitoring frame was stopped in step S206. When the communication prohibited period is ended, the communication node 20 is permitted to send a message only for the communication permitted period. After the communication permitted period is ended, the communication node 20 is given the communication prohibited period again.

In the example shown in FIG. 3, the 30-second period for switching between the sending state and the stopped state is provided between the communication permitted period of the communication node 10 and the communication permitted period of the communication node 20. However, this period need not be provided if the processing can be switched smoothly without overlapping.

Step S208: By sending messages based on the sending times determined in step S207, the message sending control unit 11 switches the data communication mode from the full-duplex communication mode to the half duplex communication mode. At the same time the data communication mode is switched in this way, the driver may be notified that a vehicle abnormality has occurred. When the abnormality in the vehicle is so slight that it does not affect the safety of the traveling of the vehicle, the driver may be suggested to travel to a dealer or a maintenance shop for inspection and repair. Since the data communication mode has already been switched to the half duplex communication mode (special mode), the dealer or the maintenance shop can quickly isolate the abnormality of the vehicle and carry out inspection and repair.

Step S209: The message sending control unit 11 determines whether the communication has ended. When the communication is not ended (S209, NO), message sending in the half duplex communication node is continued; if the communication is ended (S209, YES), the processing is ended.

Second Embodiment

Figure 4:
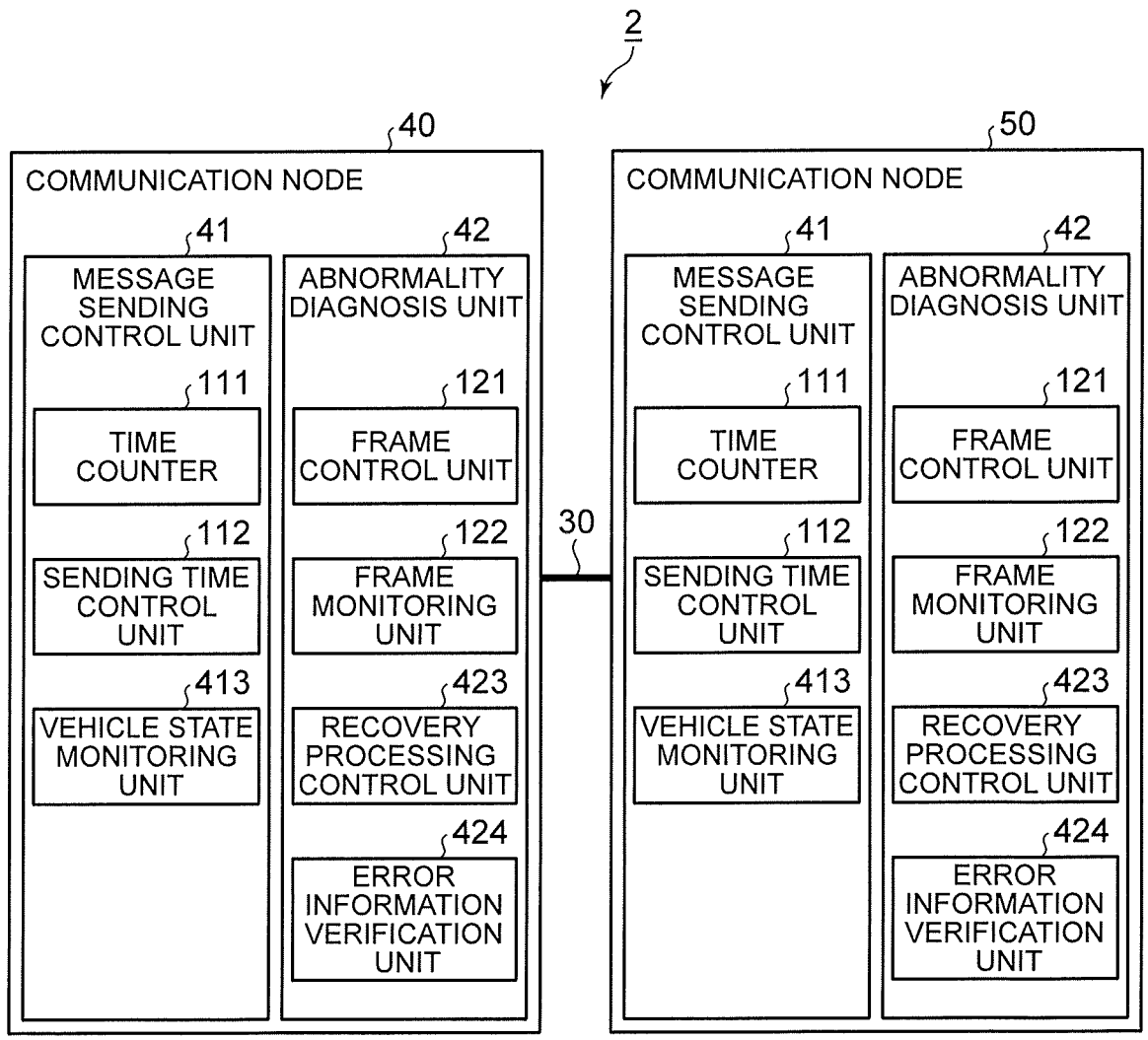
FIG. 4 is a functional block diagram of a communication system according to a second embodiment of the present disclosure.

<Configuration> FIG. 4 is a functional block diagram of a communication system 2 according to a second embodiment of the present disclosure. The communication system 2 shown in FIG. 4 is configured in such a way that communication nodes 40 and 50, each of which includes a message sending control unit 41 and an abnormality diagnosis unit 42, are communicably connected via a communication bus 30.

The communication system 2 according to the second embodiment is different from the communication system 1 according to the first embodiment in that each of the communication nodes 40 and 50 further includes a vehicle state monitoring unit 413, a recovery processing control unit 423, and an error information verification unit 424. The communication system 2 according to the second embodiment will be described below with focus on the difference in the configuration. The same reference numeral is used for the same component, and its description will be omitted.

The message sending control unit 41 of each of the communication nodes 40 and 50 includes the time counter 111 and the sending time control unit 112 as a third processing unit, and the vehicle state monitoring unit 413 as a sixth processing unit. The message sending control unit 41 uses these processing units to control the sending of a message, which includes data frames, to the other communication node.

The vehicle state monitoring unit 413 monitors the state of a vehicle on which the communication system 2 is mounted. The state of the vehicle to be monitored includes at least the speed of the vehicle, the engine speed, whether the vehicle is in the manual driving mode or in the autonomous driving mode, and the display content of the meters.

The abnormality diagnosis unit 42 of each of the communication nodes 40 and 50 includes the frame control unit 121 as a first processing unit, the frame monitoring unit 122 as a second processing unit, the recovery processing control unit 423 as a fourth processing unit, and an error information verification unit 424 as a fifth processing unit. The abnormality diagnosis unit 42 uses these processing units to control the sending of the monitoring frame to be sent from its own communication node to the other communication node and diagnoses whether an abnormality occurs in the monitoring frame sent from the other communication node to its own communication node.

When the frame monitoring unit 122 detects the missing condition of the monitoring frame that should be sent from the other communication node, the recovery processing control unit 423 performs the predetermined failsafe recovery processing to see if the cause of the monitoring frame missing condition has been removed and the missing condition has been solved.

The failsafe recovery processing is performed to check for abnormalities other than a steady bit error (such as bit corruption or bit loss) that occurs in the communication bus 30. For example, the failsafe recovery processing is performed to check for a failure in the Ethernet communication chipset or a temporary bug. An example of the failsafe recovery processing is to reset the power supply of the communication node or to reset the Ethernet communication chipset.

The error information verification unit 424 acquires the predetermined error information from the microcontroller or the transceiver (not shown) of its own communication node. This error information is the information that can be used to verify whether the monitoring frame missing condition was caused by a bit corruption in the communication bus 30 (for example, a CRC error or an alignment error related to MAC address error detection defined in Ethernet standard IEEE 802.3).

As with the communication nodes 10 and 20 described above, each of the communication nodes 40 and 50 is any of the following: (1) a microcontroller that includes a processor and a memory, (2) an ECU configured by hardware such as a transceiver that includes a chipset for performing Ethernet communication, and (3) a switching hub or a gateway that can relay data communication between ECUs.

Figure 5A:
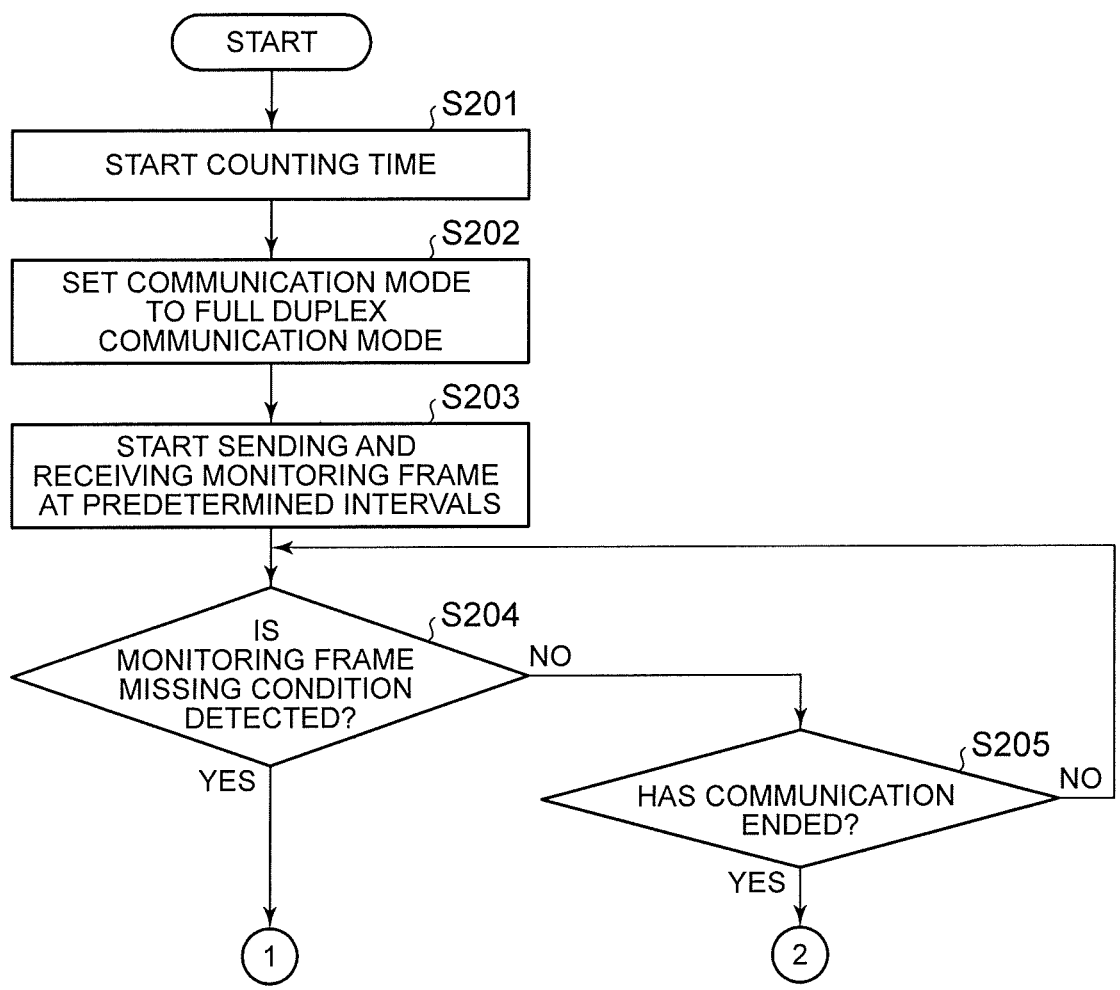
FIG. 5A is a flowchart showing the communication control processing procedure performed by each of the communication nodes in the second embodiment.
Figure 5B:
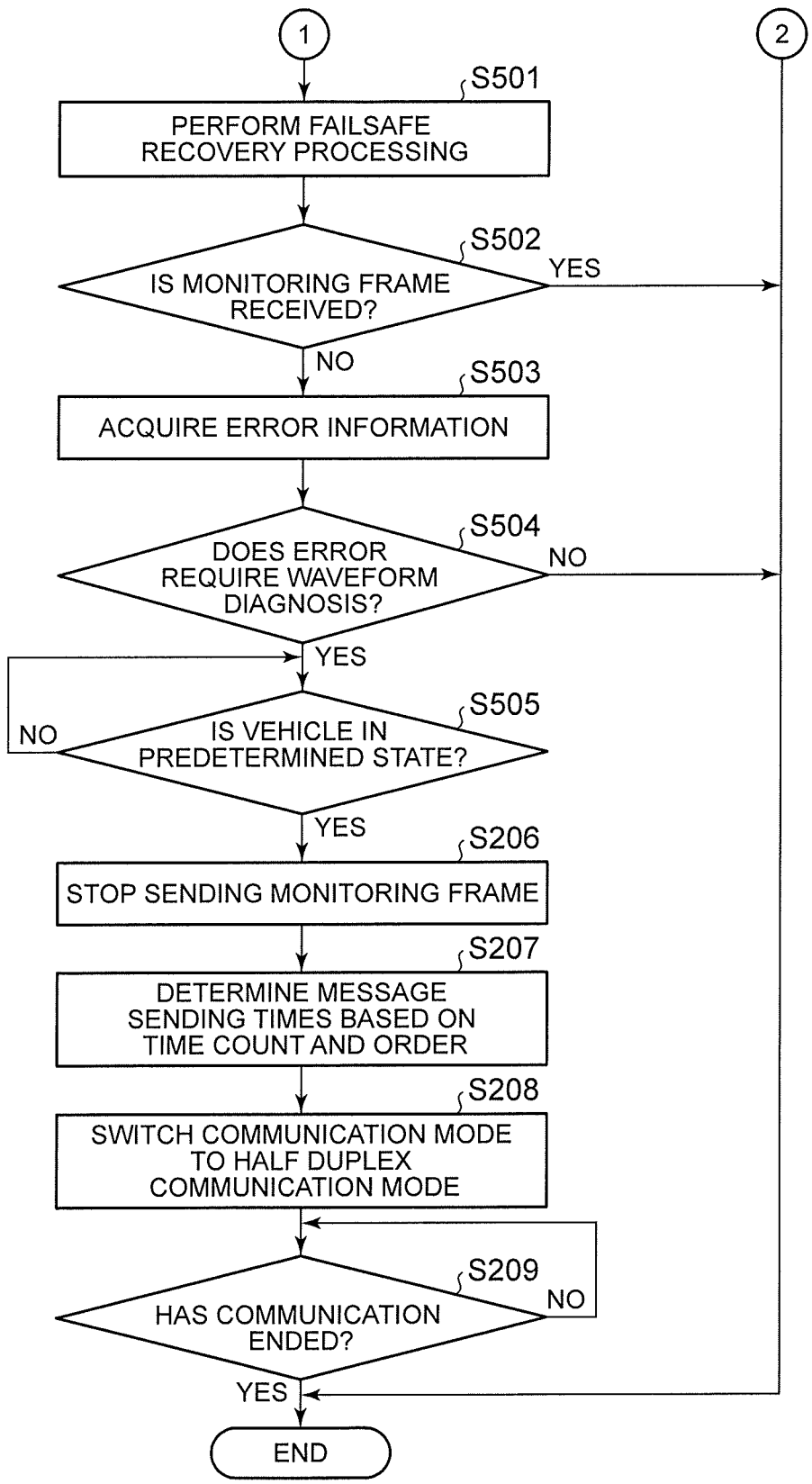
FIG. 5B is a flowchart showing the communication control processing procedure performed by each of the communication nodes in the second embodiment.

<Control> Next, the control performed by the communication system 2 according to the second embodiment of the present disclosure will be described with further reference to FIG. 5A, FIG. 5B, and FIG. 6. FIG. 5A and FIG. 5B are flowcharts showing the communication control processing procedure performed by each of the communication nodes 40 and 50. FIG. 5A and FIG. 5B are connected by connector 1 and connector 2. In FIG. 5A and FIG. 5B, a step performing the same processing that is shown in FIG. 2 described above is given the same step number. FIG. 6 is a diagram showing an example of vehicle states used by the vehicle state monitoring unit 413 to determine whether the data communication mode may be switched.

The communication control shown in FIG. 5A is started in each of the communication nodes 40 and 50, for example, when the ignition of the vehicle is turned on (IG-ON).

When the frame monitoring unit 122 detects a monitoring frame missing condition in step S204 (S204, YES) after the processing in steps S201 to S203, the processing proceeds to step S501 in FIG. 5B. When the frame monitoring unit 122 does not detect a monitoring frame missing condition (S204, NO), the processing proceeds to step S205.

Step S501: The recovery processing control unit 423 performs the failsafe recovery processing for its own communication node. As described above, the failsafe recovery processing is the processing that attempts to eliminate a monitoring frame missing condition to solve the missing condition.

Step S502: After performing the failsafe recovery processing, the recovery processing control unit 423 determines whether the monitoring frame is received from the other communication node. That is, in the processing in this step, the recovery processing control unit 423 determines whether the missing symptom has been solved and, as a result, the monitoring frame can be received again from the other communication node after the failsafe recovery processing. When the monitoring frame can be received from the other communication node (S502, YES), the processing is ended; on the other hand, when the monitoring frame cannot be received from the other communication node (S502, NO), the processing proceeds to S503.

Step S503: The error information verification unit 424 acquires the error information from the microcontroller or the transceiver of its own communication node. This error condition is used to determine whether the monitoring frame missing condition was caused by an error considered to be a bit corruption on the communication bus 30 as described above, that is, whether the monitoring frame missing condition was caused by an error that requires waveform diagnostics for detailed factorial analysis.

Step S504: The error information verification unit 424 of each of the communication nodes 40 and 50 determines, based on the error information acquired by each communication node, whether the error occurring in the communication bus 30 is an error that requires waveform diagnosis. When it is determined that the error requires waveform diagnosis (S504, YES), the processing proceeds to S505; on the other hand, when it is determined that the error does not require waveform diagnosis (S504, NO), the processing is ended.

Step S505: The vehicle state monitoring unit 413 determines whether the vehicle state satisfies a condition for allowing the switching of the data communication mode from the full duplex communication mode to the half duplex communication mode. The condition for allowing the switching of the data communication mode is determined on the premise that the safety of the vehicle can be secured, based on which vehicle function each of the communication nodes 40 and 50 performs.

FIG. 6 shows a relationship between vehicle functions performed by a communication node and vehicle state conditions. For example, when the communication node performs the function related to vehicle traveling, the required vehicle state condition is "Vehicle speed: 0 km/h" and "Engine speed: 0 rpm" in which case the vehicle is stopped. When the communication node performs the function related to autonomous driving, the required vehicle state condition is "Vehicle speed: 0 km/h" and "Autonomous driving flag: OFF" in which case the vehicle is stopped in the manual driving mode. When the communication node performs the function related to a meter display, the required vehicle state condition "Actual vehicle speed: 0 km/h" and "Meter-displayed vehicle speed: 0 km/h". When the communication node performs the function related to multimedia or failure diagnosis, no condition is assumed. When the vehicle is in a predetermined state in which any of the conditions is satisfied (S505, YES), the processing proceeds to S206.

After that, each of the communication nodes 40 and 50 determines the sending times based on the count value and the order and, then, sends messages based on the determined sending times. In this way, the data communication mode is switched from the full-duplex communication mode to the half duplex communication mode (steps S206 to S209).

In the above description, the processing in steps S501 to S505 is performed by both the communication nodes 40 and 50. Instead of this, only the communication node that has detected a monitoring frame missing condition may perform the processing in steps S501 to S505. In this case, the communication node that performs the processing in steps S501 to S505 is required only to notify the communication node that does not perform the processing in steps S501 to S505 about the execution result.

[Operations and Effects]

As described above, according to the communication system in the embodiments of the present disclosure, the predetermined monitoring frame is sent and received between the communication nodes while data communication is performed between the communication nodes in the full-duplex communication mode. When a monitoring frame missing condition is detected by one of the communication nodes, the data communication is switched to the half duplex communication mode based on the predetermined condition. Switching the data communication mode from the full duplex communication mode to half duplex communication mode in this way allows the communication waveform from each communication node to be observed alternately and independently, makes it possible to diagnose an abnormality based on the communication waveform.

According to the communication system in the embodiments of the present disclosure, one communication node that detects a monitoring frame missing condition stops sending the monitoring frame to the other communication node. Stopping sending the monitoring frame in this way allows both communication nodes to detect that a monitoring frame missing condition has occurred, making it possible for the data communication mode to be switched from the full-duplex communication mode to the half duplex communication mode quickly without delay.

According to the communication system in the embodiments of the present disclosure, when a monitoring frame missing condition is detected but the monitoring frame missing condition is solved by performing the predetermined fail-safe recovery processing, the data communication mode is not switched but stays in the full duplex communication mode. Allowing the data communication mode to stay in the full duplex communication mode in this way eliminates the need for the data communication mode to be switched to the half duplex communication mode when an abnormality is not steady but instantaneous, making it possible to start processing quickly.

According to the communication system in the embodiments of the present disclosure, when a monitoring frame missing condition is not solved by the failsafe recovery processing but when the error information, acquired from the microcomputer, indicates that the monitoring frame missing condition is not caused by an abnormality in the communication waveform flowing through the communication bus, the data communication mode is not switched but stays in the full duplex communication mode. Allowing the data communication mode to stay in the full duplex communication mode in this way can avoid the unnecessary switching of the data communication mode from the full-duplex communication mode to the half duplex communication mode.

According to the communication system in the embodiments of the present disclosure, even when a monitoring frame missing condition is caused by an abnormality in the communication waveform flowing through the communication bus, the data communication mode is switched from the full duplex communication mode to the half duplex communication mode after the vehicle enters the state in which the communication mode can be switched to the half duplex communication mode. Switching the data communication mode in this way allows the abnormality to be diagnosed based on the communication waveform while securing the traveling safety of the vehicle.

Although one embodiment of the present disclosure has been described above, the aspects of the present disclosure include not only a communication node and a communication system that includes communication nodes but also a communication control method and a communication control program performed by a communication node, a computer readable non-transitory recording medium storing the program, or a vehicle on which the communication node is mounted.

The present disclosure is applicable to a communication system in which a plurality of communication nodes are communicably connected.

What is claimed is:

1. A communication system comprising two communication nodes communicably connected in a full duplex communication mode via the same communication line, wherein
   each of the two communication nodes including a memory and a processor that is configured to:
   send a predetermined monitoring frame to another communication node at predetermined intervals and to receive the predetermined monitoring frame from the other communication node at predetermined intervals;
   detect a monitoring frame missing condition, the monitoring frame being received from the other communication node; and
   switch communication with the other communication node from the full duplex communication mode to a half duplex communication mode when a predetermined condition is satisfied during communication in the full duplex communication mode, where the predetermined condition is detecting the monitoring frame missing condition.

2. The communication system according to claim 1, wherein the processor is further configured to:
   stop sending the monitoring frame to the other communication node when the monitoring frame missing condition is detected.

3. The communication system according to claim 1, wherein the processor is further configured to:
   perform predetermined recovery processing when the monitoring frame missing condition is detected and to determine whether the monitoring frame missing condition has been solved, and
   include in the predetermined condition a condition that the monitoring frame missing condition has not been solved.

4. The communication system according to claim 3, wherein the processor is further configured to:
   determine, based on predetermined information, whether the monitoring frame missing condition is caused by an abnormality in a communication waveform flowing through the communication line when the monitoring frame missing condition has not been solved, and include in the predetermined condition a condition that the monitoring frame missing condition is caused by the abnormality in the communication waveform flowing through the communication line.

5. The communication system according to claim 4, wherein the processor is further configured to:

determine whether a vehicle state is a state that allows switching to the half duplex communication mode when the monitoring frame missing condition is caused by the abnormality in the communication waveform flowing through the communication line, and include in the predetermined condition a condition that the vehicle state is a state that allows switching to the half duplex communication mode.

* * * * *